(12) United States Patent  
Tautuhi et al.

(10) Patent No.: US 7,306,728 B2
(45) Date of Patent: Dec. 11, 2007

(54) ROTOR AND METHODS OF USE

(75) Inventors: Raymond Taurua Tautuhi, Invercargill (NZ); Frank John Fielding, Dunedin (NZ)

(73) Assignee: Zenergy International Limited, Auckland (NZ)

( * ) Notice: Subject to any disclaimer, the term of this patent is extended or adjusted under 35 U.S.C. 154(b) by 448 days.

(21) Appl. No.: 10/806,335

(22) Filed: Mar. 23, 2004

(65) Prior Publication Data

US 2005/0211618 A1  Sep. 29, 2005

(51) Int. Cl.
B01D 63/16 (2006.01)
F01D 1/22 (2006.01)
F03B 5/00 (2006.01)

(52) U.S. Cl. .............................. 210/321.68; 210/512.1; 210/512.3; 210/416.1; 415/232; 416/3; 416/9

(58) Field of Classification Search ............ 210/321.68
See application file for complete search history.

(56) References Cited

U.S. PATENT DOCUMENTS

| 5,035,811 | A | * | 7/1991 | Grondin et al. ............. 210/806 |
| 5,158,440 | A | * | 10/1992 | Cooper et al. ............ 417/423.1 |
| 5,324,177 | A | | 6/1994 | Golding et al. |
| 2006/0054549 | A1 | * | 3/2006 | Schoendorfer ........... 210/360.1 |

* cited by examiner

Primary Examiner—Krishnan S. Menon
(74) Attorney, Agent, or Firm—Lowe Hauptman Ham and Berner LLP

(57) ABSTRACT

A shaftless rotor includes at least two recessed portions. The portions are shaped to enable the rotor to rotate by the application of fluid flow to the rotor. The centre of mass of the rotor is substantially at the centre of the volume of space occupied by the rotor.

20 Claims, 2 Drawing Sheets

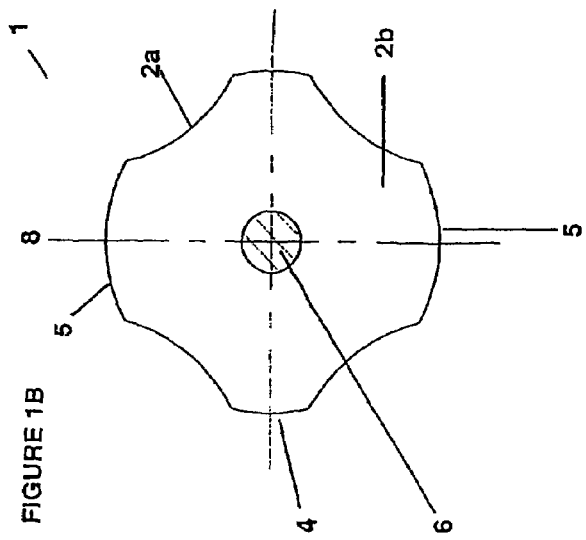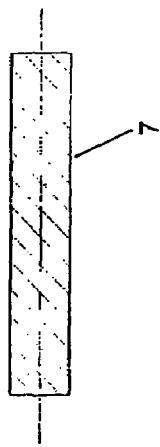
FIGURE 1B
FIGURE 1D
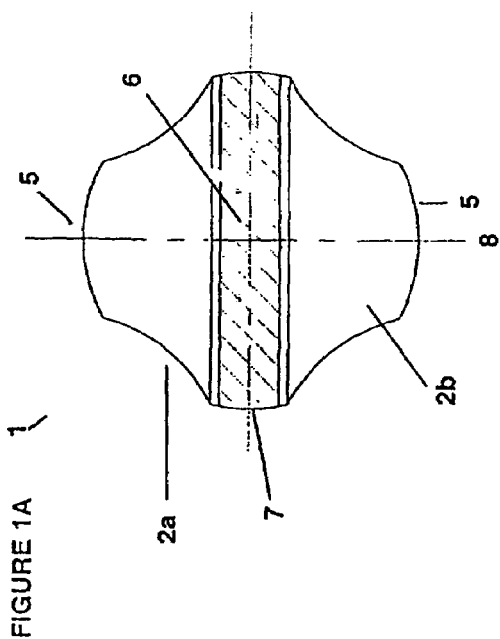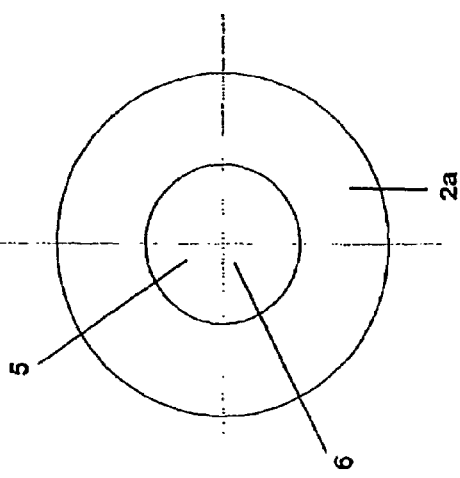
FIGURE 1A
FIGURE 1C

ROTOR AND METHODS OF USE

TECHNICAL FIELD

This invention relates to an improved rotor and applications in which this rotor may be employed. Specific reference will be made to the improved rotor disclosed being used in a number of different applications with advantages over the prior art in each case. For example, such an improved rotor may be used in a power generation system, as a fuel filtering element, as a water conditioner or a contaminant or pollution filter if required.

Those skilled in the art should appreciate that numerous applications are envisioned for such an improved rotor and reference to specific applications for such a rotor throughout this specification should in no way be seen as limiting.

BACKGROUND ART

Large numbers of energy transfer apparatus' have previously been developed to convert one form of energy into another form of energy. For example, an energy transfer apparatus may be defined as an engine which converts potential chemical energy into rotational energy of a shaft, or an electricity generator which converts rotational energy of a shaft or which harnesses the pressure of a gas to create an electrical current. An energy transfer apparatus may also be configured as a pump that transfers electrical energy or potential chemical energy of a fuel to kinetic energy of a gas or liquid.

Some of these types of machines employ a rotor that is mounted on a shaft within a housing. A pressurised gas or fluid may be supplied to the interior of the housing to contact the rotor and to drive it and the attached shaft in a circular manner. Kinetic energy can be removed from the system by placing a load on the rotating shaft attached to the rotor, or electrical energy may be generated from the system by placing a magnetic element within the rotor and by placing an electrical conductor on or outside of the housing. As the rotor rotates, an electrical current will be induced into the electrical conductor associated with the housing. Such machines may also be driven in the opposite manner to provide a pump when a conductor on the outside of the housing is energised by an alternating current, or when a rotatable shaft associated with the rotor is driven in a circular manner.

These types of machine are very popular and work well in the applications in which they are designed to perform in. However, there are some inherent limitations and inefficiencies present in the designs used to implement these machines.

The rotor or rotors are commonly fixed in place within a rotor housing through either a connection to a rotatable shaft mounted on a set of bearings, or through direct connection of the rotor to a set of bearings associated with the rotor housing. As there is a physical connection between the rotor and other components of the machine there are also energy losses from the rotational energy of the shaft to friction when the rotor moves. This in turn reduces the efficiency of the machine and reduces the total power or amount of energy that can be transferred.

By attaching a drive shaft to a rotor this also increases the mass and hence the inertia of the rotor. More energy is therefore needed to start the rotor moving and also to bring it up to an optimum operational speed.

The addition of bearing systems to link the rotor to the rotor housing also increases the complexity of the resulting machine and hence the amount of time required to construct it, and also the costs associated with manufacturing it.

Furthermore, in the cases of rotary combustion engines gas seals are also required between a rotor and walls of the housing in which it is adapted to rotate. These seals are used to trap pressurised gas in compartments formed within the rotor housing, and must also move with an arm or lobe of the rotor in operation. These types of seals are relatively complicated to produce and maintain, and are therefore another factor that increases the costs associated using such machines.

An improved energy transfer apparatus with a novel rotor which did not need to be directly or physically connected to the rotor housing and which provided substantial efficiency improvements to the resulting energy transfer apparatus would be of advantage over the prior art.

A large number and range of filters have also been developed to remove impurities or contaminants from gases and liquids. The removal of contaminants is an important health and safety issue where the preparation of food and beverages is concerned. Contaminants may also need to be removed from a fluid to be released into the environment if such contaminants could cause harm to local flora and fauna. Contaminants or pollutants can also interfere with numerous chemical processes to reduce product or energy yield. In numerous instances the removal of contaminants is an important issue.

Physical barrier or mechanical filters have been developed which, through provision of a specific mesh gauge or membrane pore size will restrict the passage of large contaminant particles or molecules. However, these types of mechanical filters can become blocked by contaminants over time, substantially increasing the amount of maintenance work that needs to be completed on an apparatus that uses such filters. Furthermore mechanical filters can also substantially slow down the flow rate of the fluids which they are designed to filter. This in turn may lead to a significant slow down in the delivery of filtered fluids, and in turn may slow any processes or machinery that uses same.

Another type of filter commonly used is a catalytic converter. These filters employ a chemical catalyst that promotes a particular chemical reaction involving the contaminants to be removed. The presence of the catalyst promotes such a reaction but in turn the catalyst is not consumed within the resulting reaction.

However, in most instances the catalysts required for such reactions are rare materials that substantially increase the cost of providing such types of filters.

An improved filtering or contaminant breakdown system that solved any or all of the above problems would be of advantage. Specifically a filtering system that did not rely on physical means to interfere with the passage of contaminants through a conduit would be of advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description that is given by way of example only.

DISCLOSURE OF INVENTION

According to one aspect of the present invention there is provided a shaftless rotor that includes at least two recessed portions on opposite sides of the rotor wherein the portions are shaped to enable the rotor to rotate by the application of an external force, and wherein the centre of mass of the rotor is substantially in the centre of the volume of space occupied by the rotor.

According to a further aspect of the present invention there is provided a rotor substantially as described above wherein the recessed portion of the rotor includes at least one curved surface.

According to another aspect of the present invention there is provided an energy transfer apparatus that includes a rotor substantially as described above.

According to yet another aspect of the present invention there is provided a filtration apparatus that includes a rotor substantially as described above.

According to a further aspect of the present invention there is provided a rotor substantially as described above incorporated into a filtering system that filters a liquid selected from the group including: fuel; water; waste materials.

The present invention may be adapted in some embodiments to provide an energy transfer apparatus. As discussed previously, such an apparatus may be used to convert energy in one form into energy in an alternative form. The present invention may be adapted to provide, for example, generators, motors or pumps if required. Furthermore, the present invention also incorporates a novel rotor design that may be used within an energy transfer apparatus. However, those skilled in the art should also appreciate that the rotor design discussed below may be used in applications other than energy transfer devices or apparatus.

The present invention may also be in other embodiments to provide a filtering system. The exact mechanism that occurs is not well understood however it is the applicant's experience that such a system can be used to either remove and/or breakdown contaminants present in a fluid element that flows past the rotor discussed above. It is envisaged by the applicant that such a filtering system may be used to eliminate the detrimental effects of contaminants in a wide range and number of different types of fluid elements depending on the particular application which the filtering system (and hence the rotor) is used within. For example, such a filtering system may be used to inactivate the harmful contaminants present within vehicle or machinery fuels, waste fluids to be discharged into the environment, or for example, to improve the quality of drinking water. Those skilled in the art should appreciate these particular applications should also in no way be seen as limiting as the present invention may be used to filter any number of different types of fluid element if required.

In some embodiments an apparatus employing the rotor may be configured to include more than one rotor. Those skilled in the art should appreciate that such an apparatus may incorporate any number of rotors configured to rotate independently of one another or alternatively through the rotors used being linked together to rotate around a single central axis.

In such instances numerous rotors may be combined together into a single apparatus. A plurality of rotors may be provided to boost the output or effect of the apparatus constructed. For example, if the rotors involved are used in a filtering system, fluid may be channelled from a housing containing one rotor downstream through several other housings also containing rotors to provide a high level of filtering to the fluid element. Multiple rotors may also be used in a similar way to boost the energy output of an energy transfer apparatus.

In a preferred embodiment the present invention employs a rotor which is adapted to rotate with a substantially circular motion, preferably within a housing.

In a preferred embodiment the rotor may be provided or located within a housing. Such a housing may form a container or enclosure for the rotor and may have one or more inlet ports and one or more outlet ports through which a gas or a liquid may enter and exit the housing. In some embodiments these ports may be provided to supply and remove a liquid or gas used to place rotational force on the rotor. Alternatively these ports may form the inlets and outlets to a pump or a filtering system used to remove contaminants from a fluid element.

In a preferred embodiment a rotor may include at least one recessed portion. Each portion may define a section or area of the rotor that combined with other portions forms the entire rotor.

In a further preferred embodiment the rotor may include two recessed portions only. These recessed portions are located one on each side of the rotor with an approximately cylindrical central portion therebetween, said central portion having an arcuate outer surface, and being formed as a continuous band around the circumference of the rotor; and, two tip regions, one on either side of a recessed portion, remote from the central portion.

Reference throughout this specification will also be made to the rotor formed including two recessed portions only. However, it should be appreciated by those skilled in the art that other configurations of the rotor are envisioned and reference to the above only throughout this specification should in no way be seen as limiting. For example, in other embodiments a single recessed portion only may be provided or alternatively three or more separate recesses may also be incorporated into the rotor if needed.

In a preferred embodiment a recessed portion of the rotor may include at least one curved surface. A curved surface in the recessed portion is better adapted to either channel a liquid or gas through rotation of the rotor, or to be driven by a pressurised liquid or gas directed towards the side or edge of the rotor. Alternatively, a curved surface can be used to cup and collect a significant portion of any liquid or gas directed towards the edge of the rotor and to use same to drive the motion of the rotor. In this situation a curved surface may be used to cup and push a liquid or gas present in the rotor housing and to pump same out through an outlet of a housing.

In a preferred embodiment the weights or masses of the recessed portion or portions may be balanced or controlled during manufacture so as to place the centre of mass of the rotor at a point substantially in the centre of the volume of space occupied by the rotor. The centre of mass of the rotor may be defined as a point in space at which the mass of the rotor could theoretically be concentrated without affecting its behaviour under the action of an external force or forces.

This implementation of the rotor will give it a substantially balanced configuration. The rotor when in motion will tend to rotate around or about a single axis of rotation orientated substantially through the centre of the rotor. This design of rotor substantially increases its stability when in motion. As the mass of the rotor is balanced between its opposed portions this acts to provide the rotor with a stable motion when rotated, eliminating the chance of an eccentric motion being induced into the rotor. Furthermore the balanced nature of the rotor will allow it to spin up to an optimal operating speed or revolutions per minute quickly when in use.

In a further preferred embodiment both the rotor and also the housing within which it is to rotate may have a height greater than its width or alternatively a width greater than its height. This configuration of the rotor and its housing will therefore restrict the rotor to rotating along one axis rotation only. The physical dimensions of the rotor and housing used will preclude the rotor from flipping over or turning about a different axis to that required when in operation.

In one preferred embodiment a pair of opposed faces of the rotor may include less material or have a lower weight or density than other directly adjacent areas of the rotor. For example, in one embodiment the sides of the rotor may weigh less than the top and bottom of the rotor, which will allow an insert of additional material to be applied to the sides of the rotor while still keeping the rotor balanced.

For example, in some embodiments additional material may be added to portions of the rotor depending on the particular application it is to be used within. By modifying the weights or densities of each side, the final rotor design may still have a substantially balanced configuration.

Preferably an inlet port provided within a rotor housing may be located at a position which will allow it to supply fluid element into the housing at an angle which forms a tangent to the direction of rotation of the rotor. In the instance where the fluid element introduced is used to drive the motion of the rotor, the orientation or direction of entry of the driving fluid element may be controlled so as to drive the fluid element onto the farthest edges or side of the rotor as opposed to its centre areas. By driving fluid element onto these areas this provides the greatest torque or turning effect possible to the rotor from the introduced fluid element.

In some embodiments fluid elements supplied to the housing may be sourced from a closed loop system which recirculates all the fluid elements used with the present invention. In such an instance there is no need to continue supplying new driving fluid element which may be recycled and re-used. This feature of the invention may be employed in an energy transfer apparatus.

In a preferred embodiment the housing may include a single inlet and a single outlet port only. However, any number of inlet or outlet ports may be used if required.

In a one embodiment both ports are located on the same side of the housing with the inlet port positioned above the outlet port. This feature of the invention may be employed in an energy transfer apparatus. This configuration of the ports allows fluid element(s) supplied from the inlet port to place a sideways or tangential force on the rotor, then allows the fluid element(s) introduced to drop or gravitate down to the bottom portions of the housing where it can be drained out through the outlet port. As the fluid element(s) circulates to the outlet port it must pass underneath the rotor and will thereby act to lift upwards and separate the bottom of the rotor from the bottom face of the housing. This will provide the rotor with a "cushion" of fluid element(s) underneath its rear or bottom area when it is located and rotated within the housing. Furthermore, centrifugal forces present in the rotor under rotation will also act against the force of gravity to again hold the rotor off the bottom face of the housing.

However, in other embodiments where the rotor is used as part of a filtering system the inlet and outlet ports for the housing may be provided on opposite sides of the housing. This allows the filtering system constructed to be provided as an "in-line" element within or as part of a fluid element conduit. The filtering system constructed will simply extend the length of the normal conduit used to transfer a fluid elements from one location to another and may filter the fluid elements involved as it is transferred. However, those skilled in the art should also appreciate that with such a filtering system, the inlet and outlet ports of the housing used may also be positioned one above the other if required. Reference to the above throughout this specification should in no way be seen as limiting.

In a preferred embodiment the rotor may in use be configured as a "floating" rotor with no direct or physical connections to the housing or any other components physically associated with the housing. The rotor may simply be placed within the housing to rotate within same without the use of any bearing systems or associated locating or fixed drive shafts. By providing a floating rotor, this eliminates the losses of kinetic energy from the rotor through frictional contact with components of the housing. Preferably the rotor may rotate within the housing and be supported by the fluid element(s) introduced and circulated through the inlet and outlet ports, where this fluid element(s) is used to cushion the bottom of the rotor and lift it up and away from the bottom of the housing.

This will substantially increase the efficiency of any energy transfer apparatus that uses such a rotor as the losses of kinetic energy from the rotor through frictional contact with other components are eliminated or substantially reduced. Furthermore by providing free floating rotor to reduce frictional contact with other components of the housing this substantially reduces any chances of waste heat being generated through rotation of the rotor. This feature of the invention may substantially simplify the design of an energy transfer apparatus using such a rotor as there is no need for heat management or venting systems within the design of same.

In a further preferred embodiment the rotor's housing may also include magnetic field generating elements such as permanent magnets or electromagnets. The magnetic forces applied by these elements, in combination with a magnet or magnets present within the rotor, may lift or levitate the rotor out and away from contact with the interior side walls of the housing. This feature of the invention may again be used to reduce friction or contact between the rotor and the housing to improve the efficiency of any resulting apparatus.

The above embodiment can be used for example in a micro hydro turbine generation system handling power of 5-50 kw and suitable to provide electricity to locations near to a water source.

Those skilled in the art should appreciate that a rotor as discussed throughout this specification may also be constructed at any required scale or with any required size. Such a rotor may in some instances have a diameter of 25 millimetres or 50 millimetres if required or alternatively may range upwards in sizes of excess of 1 metre in width. For example, in other embodiments the rotor may be formed with a diameter of 1 nano-millimetre, or from 1 nano-millimetre to 5 nano-millimetres.

Numerous different types of material may also be used to construct a rotor in accordance with the present invention. The materials used will vary depending on the particular application that the rotor is used in and the performance required of the rotor in each instance.

For example the rotor or any inserts adapted to be received by the main body of the rotor may be formed from various magnetic and non magnetic materials, or rare earth materials and elements such as samarium cobalt, ferrite ceramics, alnico or rare earth materials such as rare earth neodymium iron boron. The rotor body may also incorporate or be formed from materials such as copper, titanium, aluminium, tritium, yttrium, plutonium, or any other materials known from the periodic table. In some embodiments the rotor body may also be formed from nano fibre or nano tubing incorporating organic or inorganic molecular nano materials, or composites of smart materials.

Furthermore, in some embodiments the rotor may also be formed from super conducting materials. Super conductors can exhibit extremely lower electrical resistances at low temperatures and can also be employed to float the magnets employed within any housing required for the rotor.

Furthermore protective coatings may also be applied to the rotor in some instances. For example, flat black modified phenolic resin coatings, aluminium chromate IVD, nickel plating, ceramic coatings, epoxy resins, magnesium or tantalum, or any other similar coatings may also be applied if required. In some instances the rotor may also be covered by nano mesoscale coating or any other type of smart materials if warranted.

In a preferred embodiment the rotor may include at least one magnet or magnetic element. Preferably such a component may be formed from a permanent magnet mounted within or on a side of the rotor. Furthermore, more than one magnet may also be provided with a single rotor if required.

Preferably such a magnet or magnetic material may be formed from neodymium iron boron (NdFeB) which has been magnetised to produce the magnetic field required. This material may be produced relatively inexpensively and will also exhibit the correct density and strength required for use with the rotor. Those skilled in the art should appreciate that other types of material may also be used in this instance. For example, samarium cobalt or any other rare earth materials which can be magnetised may also be used.

In some embodiments a rotor configured as discussed above may be used in an electrical energy generator where an electrical conductor is placed in close proximity to the exterior of the rotor housing. A driving liquid or gas may be supplied to an inlet port of the rotor and may be used to drive the rotor with a substantially circular motion along one axis of rotation. A rotating magnet or magnets contained within the rotor will then induce an electrical current in the conductors placed in close proximity to the housing. Such an apparatus may form a highly efficient electrical energy generator that uses the pressure of a liquid or gas to create an electrical current.

Those skilled in the art should also appreciate that other applications are also envisioned for the rotor and also any energy transfer apparatus' implemented using same. As discussed above such a rotor may be used in the design of a pump, engine, or any other similar type of machine.

It should also be appreciated that the rotor discussed above need not necessarily be used just with energy transfer systems or apparatus. As discussed above the rotor formed in accordance with the present invention may also be used with filtering systems or filtering apparatus if required. It is understood by the applicant that such a filtering system may be employed to at least reduce the activity or detrimental effects of contaminants present within a fluid flow and preferably in the best instances remove and/or breakdown these contaminants.

Preferably a rotor used in such a filtering system may include a magnet or magnetic element in the body of the rotor which in turn is spun or rotated through the action of a fluid element(s) flowing past the rotor located within a confining housing. The fluid elements passing the rotor will be subject to a comparatively strong magnetic field and will come into contact with the rotor. It is understood by the applicant that the physical crushing or pulverising effect on the fluid element(s) to be treated in combination with the varying magnetic field of the rotating magnet acts to break down the molecular structure of the contaminants within the fluid element(s) and/or remove contaminants. Preferably this crushing effect in combination with the changing magnetic field employed on the contaminants will render them less active and hence improve the quality of the final filtered fluid element(s).

Those skilled in the art should also appreciate that the filtering effect employed may be amplified through use of multiple "in-line" rotors within a fluid element conduit. The filtering effect harnessed can be applied again and again to a flow of fluid element(s) as it passes through multiple housings and past multiple rotors.

It is understood by the applicant that such a filtering system or filtering apparatus may be used to filter many different types of fluid element(s). For example, such a system may be used to filter fossil fuels to reduce the pollution emissions resulting from combustion of such fuels and also increase the efficiency of an engine using the fuels. In addition, such a filtering system may be used to treat waste materials or fluids to be discharged into the environment. The filtering system may be employed to remove and/or breakdown contaminants within such fluid flows and to therefore substantially reduce or eliminate the harmful effects on the environment caused by discharging such materials. Such a filtering system may also be used to filter water if required. Contaminants present in drinking water may be filtered or treated using such an apparatus to improve the quality of the water.

Those skilled in the art should appreciate that this type of technology may be utilised by many different industries and within many different products or processes. The food and beverage industries, manufacturing, agriculture, animal feed or building materials industries may all benefit through use of such a filtering system with the fluids they employ.

BRIEF DESCRIPTION OF DRAWINGS

Further aspects of the present invention will become apparent from the following description that is given by way of example only and with reference to the accompanying drawings in which:

FIGS. 1a, 1b, 1c show cross section side, end and top views of a rotor configured in accordance with the present invention;

FIG. 1d shows the configuration of an insert that may be incorporated into the rotor shown with respect to FIGS. 1a through 1c.

BEST MODES FOR CARRYING OUT THE INVENTION

Figure 2B:
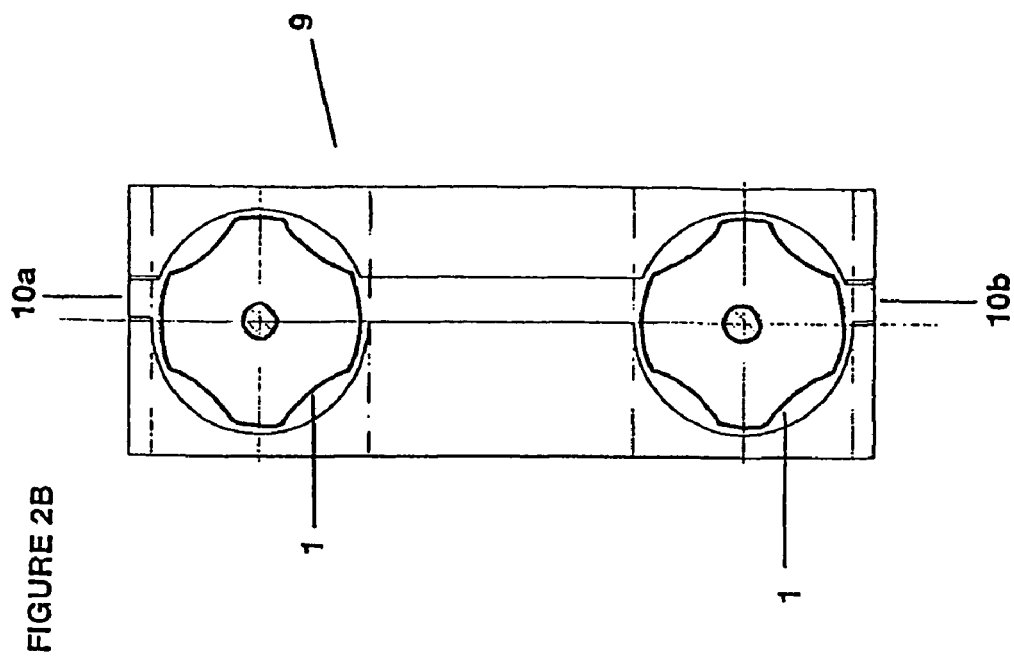
FIGS. 2a, 2b show a number of different types of housing which may be adapted to receive and enclose a rotor configured in accordance with the present invention.

FIGS. 1a through 1c show side, end and a top view of a rotor 1 configured in accordance with a preferred embodiment of the present invention. The rotor is formed with a pair of recessed portions 2a, 2b at either end of the rotor. The provision of these recesses forms a central extended band of material 4 around the central circumference of the rotor and a pair of extending tips 5 at either end of the rotor.

In the embodiment shown the weights or masses of each portion of the rotor may be balanced or adapted to place the centre of mass of the rotor (shown by reference 6) substantially within the centre of the volume of space occupied by the rotor.

In the embodiment shown with respect to FIGS. 1a through to 1c the rotor is also adapted to receive a permanent magnet insert 7. This insert is shown more clearly with respect to FIG. 1d. This magnet may in some instances be formed from NdFeB, samarium cobalt, or other types of rare earth materials. This permanent magnet may be inserted into an aperture or cavity formed within the central band of the rotor.

In this embodiment the weight of the sides of the rotor may be less than the weight of the top and bottom of the rotor to compensate for the additional material inserted into the sides and centre of the rotor. This modification of the weights of particular portions of the rotor will then provide it with a balanced configuration and a centre of mass at point 6 shown. Preferably this configuration of the rotor will balance its weight and shape so that it will rotate only around a single axis running through the centre of the rotor. This will in turn provide the rotor with a stable rotational motion around its axis 8 when in use.

The rotor 1 may also be configured to have a height greater than its width. By stretching the rotor in one dimension and placing it in a complementary shaped housing this prevents the rotor from rotating along a number of different axes. The embodiment shown of this configuration of the invention may force the rotor to rotate along axis 8 only.

Figure 2A:
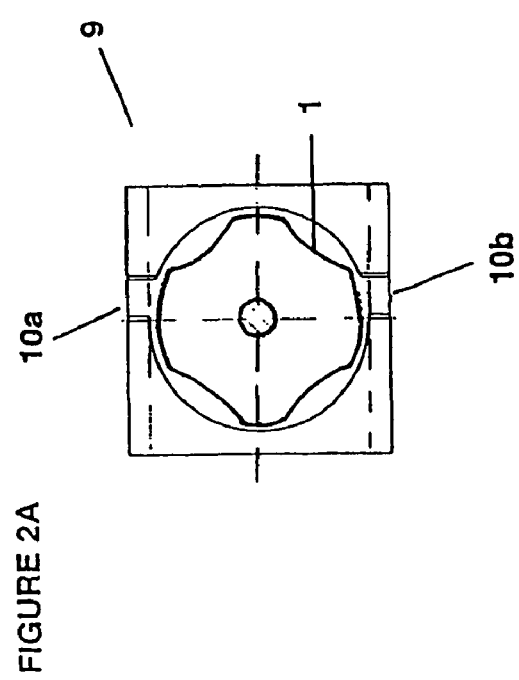

FIGS. 2a, 2b show two different sets of housing for a rotor constructed in accordance with the present invention. In the embodiment shown FIG. 2a shows a housing for a single rotor machine whereas FIG. 2b shows a housing for a dual or double rotor machine. In both instances the rotor 1 shown is the same as that illustrated with respect to FIGS. 1a through 1c.

Each housing 9 includes a pair of ports 10. The first of these ports 10a may be used to introduce a driving fluid into the interior of the housing 11 whereas the second of these ports 12b may be used to drain or remove the introduced fluid from the housing.

The cavity formed within each housing 9 may be adapted to receive each rotor 1 and allow the rotor to rotate within same. The magnetic insert 7 incorporated into the rotor can be used to provide a filtering effect or alternatively be harnessed in an energy transfer apparatus as the rotor is rotated by fluid flowing past.

The shape of the rotor 1 provided aids in the efficiency of the resulting apparatus. The curved surface of the recessed portion 2 will act to cup or collect fluid introduced through inlet port 10a as the rotor turns past the port. As this portion of the rotor allows a significant amount of the driving fluid introduced to engage with the sidewalls or face of the rotor this results in an increased efficiency driving force being applied to rotate the rotor.

In some embodiments the housing may include or be associated with a number of electrical conductors (not fully shown) disposed on the outside of the housing. These conductors will allow an energy transfer apparatus to be implemented. The conductors may form a magnetic induction pick-up system which will have an electrical current induced in these conductors as the rotor 1 and the magnet it contains rotates within the housing 9. The changing magnetic field or magnetic flux of the rotor will induce an electrical current into these conductors, thereby allowing the apparatus 10 to be used as a generator of electrical energy.

However, as discussed above the rotor 1 may also be used within a filtering system if required. In such an embodiment the single rotor machine (as shown with respect to FIG. 2a), or a dual rotor machine (as shown with respect to FIG. 2b) may be provided as such a filtering system. Fluid may enter through the inlet port 10a of either housing and rotate the rotor while passing the magnetic element 7. The rotation of the rotor and magnet 7 by the fluid introduced will act to filter or treat the fluid to inactivate contaminants present within same.

In addition, if required electrical conductors may also be wound round the outside of the housing as well. These conductors may be used to generate electrical energy from the rotation of the rotor or rotors as they also perform a filtering function.

Table 1 shows the number of different industries and products that may benefit from the application of the filtering technology discussed above. In most instances the water used may be further purified, filtered or treated using the present invention to result in a higher quality, purer products.

Aspects of the present invention have been described by way of example only and it should be appreciated that modifications and additions may be made thereto without departing from the scope thereof as defined in the appended claims.

What we claim is:

1. A filtration apparatus, comprising:
  a shaftless rotor, and
  a rotor housing accommodating said rotor therein, wherein:
    the rotor is confined within a spherical envelope defined partially by an outer surface of said rotor,
    the rotor comprises at least two recessed portions, wherein
    the recessed portions are shaped to enable the rotor to rotate by the application of fluid flow to the rotor;
    the center of mass of the rotor is substantially at the centre of the volume of space occupied by the rotor; and
    at least one of the recessed portions of the rotor is configured to temporarily cup or collect the fluid.

2. A filtration apparatus as claimed in claim 1, wherein the housing incorporates one or more fluid inlet ports and one or more fluid outlet ports.

3. A filtration apparatus as claimed in claim 2, wherein the inlet port is configured to introduce the fluid into the interior of the housing in a direction eccentric in the transverse plane to a desired axis of rotation of the rotor.

4. A filtration apparatus as claimed in claim 1, wherein the housing includes an inlet port and an outlet port arranged such that
  (a) both ports are on the same side of the housing as one another; or (b) each port is on one of opposite sides of the housing; or (c) said ports are at a 90 degree angle to each other.

5. A filtration apparatus as claimed in claim 1, wherein the fluid is selected from the group consisting of: a fuel; water; and a waste material.

6. A filtration apparatus as claimed in claim 1, wherein the at least one recessed portion is a concavely curved surface.

7. A filtration apparatus as claimed in claim 1, wherein the rotor comprises:
said two recessed portions, one on each side of the rotor;
a central portion between said two recessed portions, said central portion having an arcuate outer surface and being formed as a continuous band around the circumference of the rotor; and
two tip regions, one on either side of the respective recessed portion, remote from the central portion.

8. A filtration apparatus as claimed in claim 3, wherein
the rotor is rotatable within said housing about a number of axes of rotation when no fluid is introduced into the interior of the housing through the inlet port; and
the rotor is adapted to rotate about a single desired axis of rotation among said axes when the fluid is introduced into the interior of the housing through the inlet port, said desired axis of rotation being orientated substantially through the centre of mass of the rotor.

9. A filtration apparatus as claimed in claim 1, wherein the mass of the at least one recessed portion is balanced so as to place the centre of mass of the rotor at a point substantially in the centre of the volume of space occupied by the rotor.

10. A filtration apparatus as claimed in claim 1, wherein the rotor is covered by a protective coating selected from the group consisting of: flat black modified phenolic coatings; aluminium chromate nickel plating; ceramic coatings; epoxy resins; magnesium; tantalum; and combinations thereof.

11. A filtration apparatus as claimed in claim 1, wherein the housing includes at least one magnetic field generating element.

12. A filtration apparatus as claimed in claim 1, wherein said rotor includes at least one magnet.

13. A filtration apparatus as claimed in claim 12, wherein said magnet is offset from the centre of mass of the rotor.

14. A filtration apparatus as claimed in claim 12, wherein the magnet is formed from materials including neodymium iron boron (NdFeB).

15. A filtration apparatus as claimed in claim 1, further comprising an electrical conductor in close proximity to the exterior of the rotor housing.

16. A filtration apparatus as claimed in claim 1, further comprising a magnet or magnets which are fixed within the rotor and which rotate as the rotor rotates; wherein the rotating magnet or magnets induce an electrical current in an electrical conductor integral or in close proximity to the exterior of the rotor housing.

17. A filtration apparatus as claimed in claim 1, further comprising another shaftless rotor accommodated within another rotor housing which is fluidly interconnected in at least one of series; parallel; or combinations thereof with the rotor housing of said shaftless rotor.

18. A filtration apparatus as claimed in claim 12, wherein the housing includes at least one magnetic field generating element which magnetically interacts with the magnet of said rotor to levitate the rotor out and away from contact with inner side walls of the housing.

19. A filtration apparatus as claimed in claim 7, wherein the central band comprises an aperture or cavity in which a magnet is received to be carried by said rotor during rotational movement thereof.

20. A filtration apparatus as claimed in claim 3, wherein said inlet port is located above said outlet port when said axis of rotation is oriented in a vertical direction, thereby causing the fluid supplied from the inlet port to drop or gravitate down to a bottom portion of the housing and circulate to the outlet port after passing underneath the rotor and, hence, acting to lift upwards and separate the bottom of the rotor from a bottom face of the housing.

* * * * *